United States Patent [19]

Kiasaleh

[11] Patent Number: 5,319,438
[45] Date of Patent: Jun. 7, 1994

[54] INTERFEROMETRIC, SELF-HOMODYNE OPTICAL RECEIVER AND METHOD AND OPTICAL TRANSMISSION SYSTEM INCORPORATING SAME

[75] Inventor: Kamran Kiasaleh, Richardson, Tex.

[73] Assignee: Board of Regents, The University of Texas System, Austin, Tex.

[21] Appl. No.: 825,660

[22] Filed: Jan. 24, 1992

[51] Int. Cl.$^5$ .................................................. G01B 9/02
[52] U.S. Cl. .................................. 356/345; 250/227.27
[58] Field of Search ........................ 250/227.16, 227.17, 250/227.19, 227.23; 356/345; 359/190

[56] References Cited

U.S. PATENT DOCUMENTS

| | | | |
|---|---|---|---|
| 3,939,341 | 2/1976 | Graves . | |
| 3,970,838 | 7/1976 | Goodwin et al. . | |
| 4,063,084 | 12/1977 | Goodwin et al. . | |
| 4,609,290 | 9/1986 | Cahill . | |
| 4,652,129 | 3/1987 | Martinelli . | |
| 4,697,876 | 10/1987 | Dyott | 350/96.29 |
| 4,759,627 | 7/1988 | Thylen et al. | 356/345 |
| 4,783,852 | 11/1988 | Auracher . | |
| 4,859,843 | 8/1989 | Baney et al. | 250/227 |
| 4,868,897 | 9/1989 | von Helmolt . | |
| 4,881,813 | 11/1989 | Koo et al. | 356/345 |
| 5,017,006 | 5/1991 | Poisel et al. | 356/345 |

FOREIGN PATENT DOCUMENTS 0456365 11/1991 European Pat. Off. .

OTHER PUBLICATIONS

Van Nostrand's Scientific Encyclopedia, 4th version p. 499.
Kiyoshi Nosu, "Advanced Coherent Lightwave Technologies," IEEE Communications Magazine, vol. 26, No. 2, pp. 15-21, (Feb. 1988).
L. Kazovsky, "Performance Analysis and Laser Linewidth Requirements for Optical PSK Heterodyne Communications Systems," Journal of Lightwave Technology, vol. LT-4, No. 4, pp. 415-425, (Apr. 1986).
O. Ishida, "Novel Method of Estimating Flicker Frequency Noise in Lasers," IEEE Photonics Technology Letters, vol. 2, No. 11, pp. 784-786 (Nov. 1990).
L. Kazovsky, "Balanced Phase-Locked Loops for Optical Homodyne Receivers: Performance Analysis, Design Considerations, and Laser Linewidth Requirements," Journal of Lightwave Technology, vol. LT-4, No. 2, pp. 182-195 (Feb. 1986).
H. Stark and J. Woods, "Probability, Random Processes, and Estimation Theory for Engineers," pp. 273-276 (1986).
A. Papoulis, Probability, Random Variables, and Stochastic Processes, pp. 213-214 (2d ed. 1984).
Giles et al., "Optical Self-Homodyne DPSK Transmission at 1 and 2 Gbit/s Over 86 km of Fibre," Electronics Letters, vol. 23, No. 22, pp. 1180-1181, Oct. 22, 1987.
Lohtia et al., "Performance of a 45 Mb/s Optical DFSK System Using Self-Heterodyne Detection," IEEE Pacific Rim Conference on Communications, Computers and Signal Processing, pp. 27-30, Jun. 1-2 1989.

*Primary Examiner*—Samuel A. Turner
*Assistant Examiner*—Robert Kim
*Attorney, Agent, or Firm*—Arnold, White & Durkee

[57] ABSTRACT

An interferometric, self-homodyne optical receiver is disclosed for detecting and demodulating phase modulated optical signals without requiring a local oscillator normally associated with coherent optical receivers. The self-homodyne receiver includes an interferometer having a phase modulator optically coupled to one channel of the interferometer and a phase-locked arrangement providing electrical signals which control the phase modulator and phase of one channel of the interferometer with respect to the other channel.

23 Claims, 2 Drawing Sheets

INTERFEROMETRIC, SELF-HOMODYNE OPTICAL RECEIVER AND METHOD AND OPTICAL TRANSMISSION SYSTEM INCORPORATING SAME

BACKGROUND OF THE INVENTION

1. Field of the Invention

This invention relates to an interferometric, self-homodyne optical receiver and method for the detection of digitally phase modulated optical signals without requiring a local oscillator.

2. Description of the Relevant Art

There are many different forms of optical detectors. A popular form of detector employs coherent optical techniques, including optical heterodyne/homodyne detection.

In both homodyne and heterodyne receivers, a local laser oscillator is used to provide a reference signal which is then mixed with the incoming optical signal to produce a difference or intermediate frequency, generally at radio frequency (RF). The RF intermediate frequency can then be processed using relatively straightforward RF techniques. Thus, receivers operating according to the heterodyne principle use a local laser to mix the received signal and, consequently, generate an RF signal. If the local laser and the received optical signal have identical frequencies or wavelengths, then the receiver will operate according to the so-called homodyne principle. Thus, homodyne-type receivers operate much like heterodyne receivers having an intermediate frequency centered about zero Hertz.

Homodyne-type receivers require a local oscillator which can either be phase- or frequency-locked to the input signal carrier such that the local oscillator can track a wide range of frequency and phase variations within the incoming signal. The local oscillator signal can be set precisely at the frequency of the incoming signal either in phase or 180° out of phase with the signal to provide necessary phase locking. An error signal generated from a differential amplifier is used to provide phase and frequency input to the local oscillator via feedback control.

As shown in FIG. 1, prior art homodyne receiver 10 includes a local oscillator or laser 12, the output of which is coupled or mixed with an optical input signal 14 via coupler 16. The coupled signal is then photodetected and compared using conventional photodetectors 18 and differential amplifier 20 to produce an electrical output signal 22 representative of the phase of the input signal 14. A loop filter 24 is used to electronically block unwanted noise and to electronically track phase or frequency drift, etc.

As shown in FIG. 1, prior art homodyne-type receivers require a local oscillator which must be carefully tuned to the carrier signal in order for the receiver to operate properly. Thus, a major disadvantage of conventional homodyne receivers is that they require a local oscillator and that the local oscillator must generally track the incoming signal. Thus, the oscillator linewidth requirement is very stringent. Accordingly, the local laser must maintain strict phase synchronization (provided via the above conventional phase-locked loop arrangement) for successful recovery of the received digitally phase modulated optical input signal. In order to meet these stringent requirements, an expensive laser is often used as the local oscillator having extremely narrow operating requirements. Such requirements must be maintained over varying ambient conditions (i.e., temperature, humidity, etc.).

SUMMARY OF THE INVENTION

The problems outlined above are in large part solved by the apparatus and method of the present invention. While conventional homodyne receivers described above require a local oscillator which is phase-locked to the received signal, the self-homodyne receiver of the present invention does not require a local oscillator or laser. By using an interferometer, such as a Mach-Zehnder interferometer, the present invention can demodulate phase modulated optical input signals. Also, by incorporating a feedback electrical signal coupled to one of the interferometer channels, a practical implementation of phase demodulation in an interferometric self-homodyne setting is achieved without incurring typical problems associated with conventional local oscillators. By eliminating the need for a local oscillator in the present invention, a self-homodyne receiver can be implemented at a substantial cost savings to the end user. In addition, performance of a coherent system is influenced by transmitter and receiver laser linewidths, whereas performance of the present invention is no longer influenced by the receiver linewidth due to the absence of a local oscillator, and performance of the present invention remains a function of only the remote signal source (i.e., transmitter laser linewidth). In addition, unlike conventional receivers where a polarization mismatch between the transmitted and received optical signals results in severe degradation in performance, the self-homodyne receiver of the present invention has no need for polarization control at the receiver site.

Broadly speaking, the self-homodyne optical receiver of the present invention comprises two channels optically coupled together, and an optical-to-electrical photodetector is coupled to the output of the coupled channels. A delay loop is configured within one channel, or delay channel, and a phase modulator is optically coupled to the other channel, or reference channel. The phase modulator is indirectly controlled by an electrical output signal sent from a differential amplifier which is electrically coupled to the output of the photodetector.

According to one aspect of the invention, the delay channel and reference channel are optically coupled at two locations with the phase modulator optically coupled to the reference channel between the two locations. The two locations may include a pair of evanescent couplers placed along the delay channel and reference channel. Each evanescent coupler can be a single mode 3 dB coupler.

According to another aspect of the present invention, the photodetector includes at least one photodiode coupled to the delay channel. Alternatively, the photodetector may include a pair of photodiodes coupled to both the delay channel and the reference channel. Each photodiode can produce an electrical output signal corresponding to an optical input signal.

The present invention further comprises an optical transmission system including an optical source and an optical receiver. The optical source may include a remote laser for generating an optical input signal directed into the receiver. The receiver includes a delay channel, a reference channel coupled to the delay channel at two locations. A photodetector is coupled to one end of both the delay channel and the reference channel to convert a phase delayed optical input within the delay channel signal combined with a phase modulated optical input signal within the reference channel to an electrical signal corresponding to phase shift therein. A differential amplifier is coupled to an output of the demodulator to receive the electrical signal and output a feedback electrical signal from the amplifier to the phase modulator for passively tracking the phase of the input signal in proportion to a phase difference output from the differential amplifier. Phase modulation of the input signal within the reference channel is therefore passively controlled by input from an electrical output signal emitted from the output of the differential amplifier circuit. Thus, the electrical output signal is used to provide electrical feedback phase locking onto a phase modulated optical input signal within the reference channel. A significant advantage of the present invention is that the phase-locked signal, which may track the received optical signal, is generated via a phase modulator with an input that is the feedback electrical signal from the differential amplifier, and thus the need for a local oscillator, as in conventional design, is eliminated.

In the present disclosure, "passively controlling" or "passively tracking" is used to describe a non-active technique for phase modulating the signal within the reference channel. Non-active techniques include any means which does not inject local oscillation energy into the receiver such as energy from a local laser oscillator.

According to yet another aspect of the optical transmission system, a self-homodyne optical receiver is used in combination with a remotely located optical source which generates phase modulated optical input signals. The optical input signals are transmitted through an optical communication path to the receiver having a delay channel and reference channel. The delay channel is connected to the communication path and the reference channel is optically coupled to the delay channel by first and second optical couplers placed at two spaced locations along the delay channel and reference channel similar to the structure of a Mach-Zehnder interferometer. A phase modulator is optically coupled to the reference channel for phase modulating the optical input signal coupled within the reference channel with respect to the optical input signal within the delay channel. The phase modulator is configured within the reference channel between the first and second optical couplers. By phase-lock controlling the phase modulator, the interferometer provides coherent coupling or mixing at the second optical coupler, between an optical input signal, which may preferably be phase delayed, within the delay channel and the phase modulated optical input signal within the reference channel. Thus, by phase modulating the reference channel and mixing the phase modulated signal with a phase delayed signal, the present invention achieves self-homodyne phase demodulation without requiring a local oscillator.

The present invention also contemplates a method for detecting phase modulated optical signals. The method includes receiving a phase modulated optical input signal into a delay channel and coupling the input signal into a reference channel. The input signal within the delay channel is phase delayed, and the input signal within the reference channel is phase modulated. An electrical output signal is produced proportional to the phase difference between the phase delayed input signal within the delay channel and the phase modulated signal within the reference channel. The input signal is then detected in accordance with changes in the electrical output signal.

BRIEF DESCRIPTION OF THE DRAWINGS

Other objects and advantages of the invention will become apparent upon reading the following detailed description and upon reference to the accompanying drawings in which.

Figure 1:
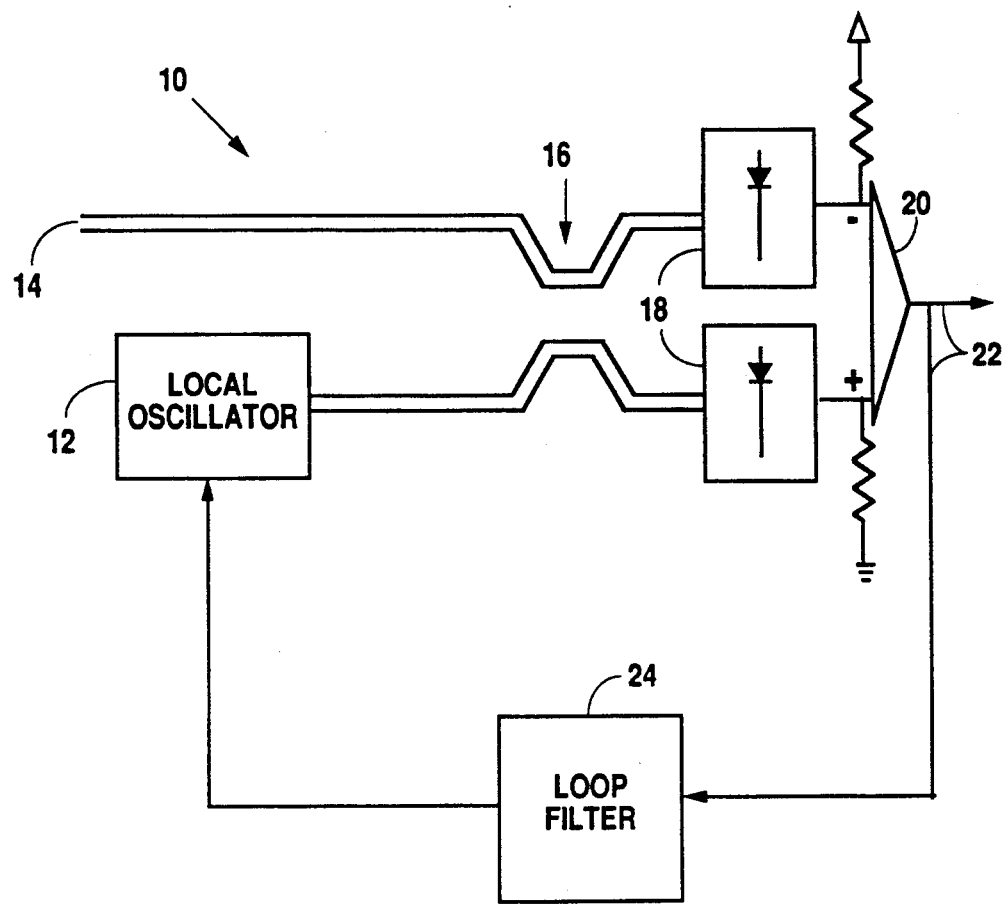
FIG. 1 is a block diagram of a prior art optical receiver.

While the invention is susceptible to various modifications and alternative forms, a specific embodiment thereof has been shown by way of example in the drawings and will herein be described in detail. It should be understood, however, that it is not intended to limit the invention to a particular form disclosed, but on the contrary, the intention is to cover all modification equivalents and alternatives falling within the spirit and scope of the invention as defined by the appended claims.

DETAILED DESCRIPTION OF THE PREFERRED EMBODIMENTS

Figure 2:
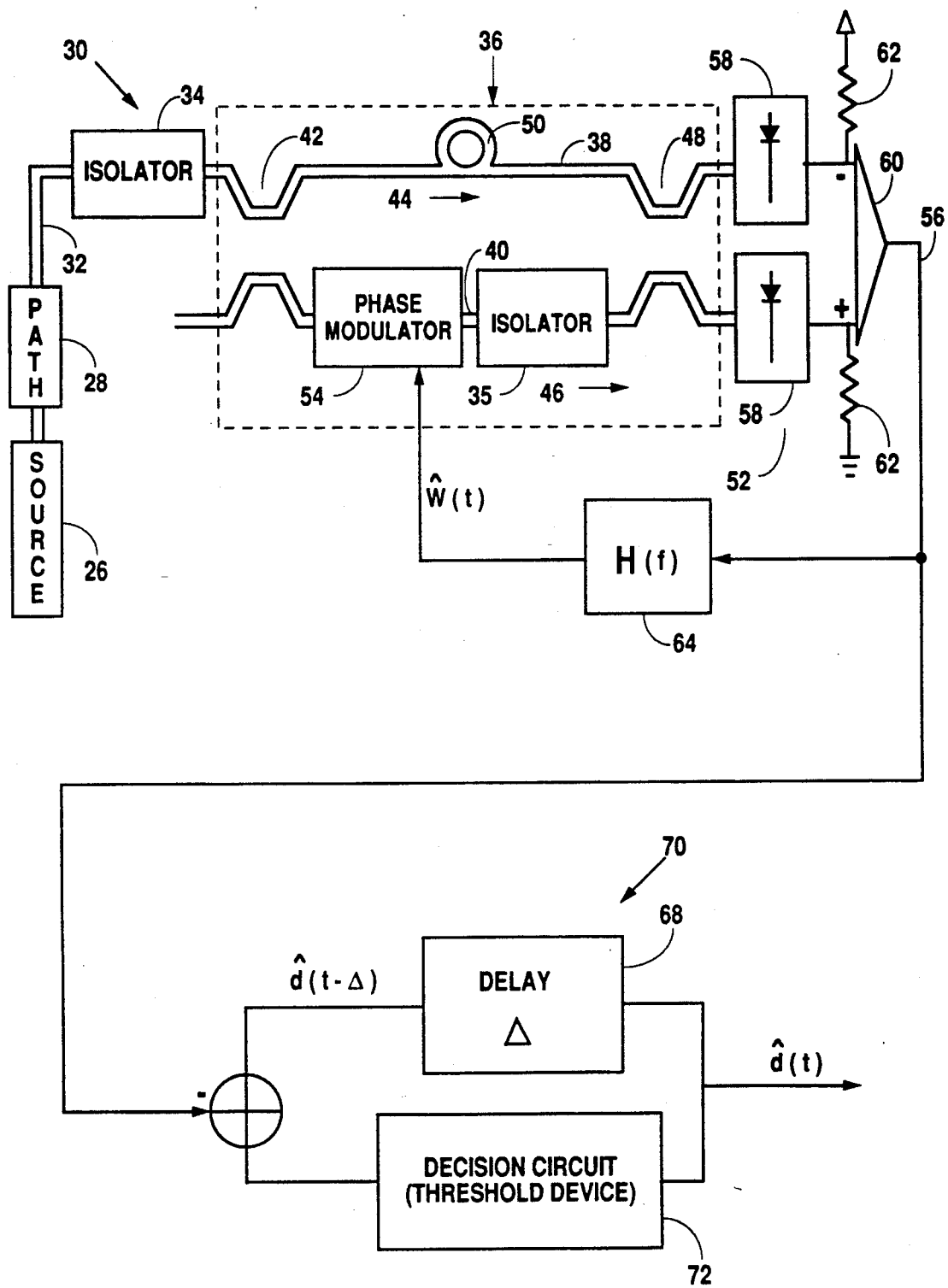
FIG. 2 is a block diagram of an optical transmission system incorporating a self-homodyne optical receiver in accordance with the present invention.

Referring now to FIG. 2, there is shown an optical transmission system incorporating an interferometric, self-homodyne optical receiver 30 according to the present invention. Receiver 30 is configured to receive an optical input signal 32, produced by optical source 26 and transmitted over a communication path 28. Optical source 26 can be, for example, a laser light source which produces a phase modulated optical signal in a known manner. Communication path 28 can be any type of known communication path such as an optical fiber, or a combination of optical and electrical communication paths. An isolator 34 of common design is provided for isolating the optical input signal 32 thereby avoiding disturbing reflections back into optical source 26. Isolator 34 can be a design, such as those designs based on Faraday rotation and which utilize yttrium iron-garnet (Garnet YIG) material and polarizers. A suitable isolator for the present application is model no. ISO-1315 produced by Newport Co. Phase-modulated input signal 32 is applied to an interferometer 36 having a delay channel 38 and a reference channel 40. Input signal 32 is split or coupled into two separate beams or optical signals via first coupler 42 of interferometer 36. Sensor signal 44 propagates through delay channel 38 and is isolated from reference beam 46 which propagates through reference channel 40. Both channels 38 and 40 are exposed to similar environmental variations such that environmental effects are mostly canceled when the phase differences of the beams 44 and 46 are detected at the output of interferometer 36.

Interferometer 36 includes two 3 dB couplers 42 and 48 which can be evanescent field couplers. Such couplers utilize a narrow spacing between two adjacent fiber cores or channels thus allowing coupling between the cores due to electromagnetic fields which extend beyond each core boundary. Further, multi- and single-mode couplers are available. Models for single-mode couplers are often based on two fundamental modes of the coupler, i.e., the even and the odd modes. First coupler 42 and second coupler 48 may be of single-evanescent variety with a 50% split ratio (i.e., 3 dB coupler) based upon phase angle ($\phi$)=90° such as model no. 945 couplers available from Amphenol Fiber Optic Products.

Shown along delay channel 38 is a delay loop 50, which allows for the introduction or a time delay in the signal in delay channel 38. In operation, loop 50 changes the phase of sensor beam 44 at the second coupler 48 interface. Thus, a phase-skewed mixing can occur at second coupler 48 depending upon the amount of phase shift caused by loop 50.

Phase shifting or modulating of reference beam 46 with respect to sensor beam 44 is achieved with a phase modulator 54 optically coupled to reference channel 40 as shown. Phase modulator 54 receives changes in input voltage via the feedback electrical signal, which will be described below, and translates those changes in input voltage into proportional phase shift in the optical signal of reference beam 46. The insertion loss is less than 2 dB and the input voltage can have a bandwidth of up to 2-6 GHz. Phase modulators are important for coherent communications, in particular for phase-shift keying techniques (PSK and DPSK). Integrated versions of phase modulators are found capable of interfacing with single-mode fiber couplers and are thereby important when embodying the present invention on integrated silicon. Thus, a preferred form of phase modulator 54 would include a Ti:LiNbO$_3$ (Lithium-Niobate) device. A single-mode wave guide is created in the Lithium-Niobate phase modulator by diffusion or ion-implantation of titanium. Different versions of Lithium-Niobate type phase modulators are possible depending upon which way the crystal is cut (either vertical or horizontal). In either case, a preferred phase modulator 54 can be obtained from Hoechst Celanese, model no. Y35539501.

As further shown in FIG. 2, a second isolator 35, similar to isolator 34, is placed within reference channel 40 to prevent backward-directed reflections to the first coupler 42. Substantial elimination of backward-reflected spurious noise, etc. prevents substantial degradation of optical input signal 32 and thus minimizing degradation of the performance of receiver 30.

Phase-shifted beams in the delay channel 38 and reference channel 40 are passed to photodetector optics 52, wherein photodetector 52 is used to convert beams 44 and 46 into an electrical output signal 56. Detection is synchronous, that is, sensor beam 44 and reference beam 46 oscillate at the same frequency in a typical homodyne configuration, and these signals are mixed or recombined using second coupler 48 and detected using a balanced arrangement as shown in FIG. 2. The delay loop 50 affords a 90° phase shift with respect to the reference beam 46 that is necessary for successful recovery of the phase modulated optical input signal 32 in the presence of non-zero 50 transmitter laser linewidth. In addition, unlike conventional receivers, where a polarization mismatch between the transmitted and received optical signals result in severe degradation in performance, the present invention has no need for polarization control at the receiver site. Specifically, the conventional receiver 10 shown in FIG. 1 requires polarization control of the signal provided from local oscillator 12 in order to avoid polarization mismatch between the received input signal 14 and the signal provided by local oscillator 12. Such polarization mismatch of conventional receivers results in severe degradation in receiver performance. Conversely, the receiver shown in FIG. 2 of the present invention does not require polarization control at the receiver site since it does not use or require any form of local oscillation or signal generation independent from the original input signal 32.

Photodetector 52 includes a pair of photodetectors 58. Photodetectors 58 are coupled to receive delay channel 38 and reference channel 40. Photodetectors 58 include a photodiode in an integrated or semiconductor device which can be integrated with phase modulator 54 and isolator 34, and which convert the optical signal generated by mixing optical signals in the reference channel 40 and delay, or input, channel 38 to an electrical signal. Typically, photodetectors 58 respond to optical signals by passing a current in the reversed bias condition which is proportional to the amount of incident light beam in watts upon the diode. Since a photodiode is essentially a current output device, it usually is operated with a current-to-voltage converter type amplifier. The amplifier or OP amp may thereby be operating in a current-to-voltage mode, which is sometimes called a transimpedance amplifier. Thus, it is contemplated that the present invention utilize either a P-I-N junction photodiode or an avalanche photodiode. An acceptable P-I-N photodiode is a model no. AR-G10 P-I-N photodiode available from Antel Optronics, Inc.

Shown coupled to photodiodes 58 is differential amplifier 60 which amplifies a difference between voltages at the (+) and (−) inputs of amplifier 60. Differences between input values are amplified using a conventional radio frequency (RF) or microwave amplifier. Depending on the information bit rate, $T_s^{-1}$, one may need an RF (bit rate less than 2 GHz) or microwave (bit rate in excess of 2 GHz) amplifier. Thus, selection of the appropriate type of amplifier 60 is application dependent. For example, either a Hewlett-Packard, Inc., model no. 8347-A (for bit rates less than 2 GHz), or a Hewlett-Packard, Inc., model no. 11975-A (for bit rates in excess of 2 GHz) are acceptable for use as differential amplifier 60. An appropriate differential amplifier 60 may be realized using GaAs devices or less expensive off-the-shelf components. If GaAs devices are used, they may be integrated into the semiconductor system of the entire receiver 30. The differential amplifier 60 may be implemented using wideband amplifiers, HAMP-5001, manufactured by Hewlett-Packard for frequencies up to and including 2 GHz. For frequencies in excess of 2 GHz, MMIG GaAs amplifiers from Hewlett Packard, model no. HMMC-5022 may be used.

Electrical output signal 56 derived from amplifier 60 represents an electrical signal which contains modulation terms as well as phase error components. Electrical output signal 56, can thereby be utilized to adjust the reference phase via modulating reference channel 40 with the aid of phase modulator 54 in a feedback arrangement. As used herein, the terms "in-phase" and "quadrature phase" refer to any pair of signals of the type sin(wt+$\phi$) and cos(wt+$\phi$), respectively. This implies that the two signals are sinusoidal with one signal 90° phase-shifted with respect to the other. The purpose of delay $\Delta$L obtainable via loop 50 is to generate the quadrature component. The signal in reference channel 40 is in phase with the received signal.

Electrical output signal 56, as shown in FIG. 2, is processed by a loop filter 64 having a transfer function H(f). Filter 64 is preferably a filter with two poles at f=0 and a single imaginary zero, however, other types of filter networks can also be used. Thus, filter 64 can be realized using operational amplifiers and passive components. Filter 64 includes two OP amps operating at frequencies in the range of dc to several MHz. Depending upon the remote laser source linewidth, the operating range could extend from a few MHz to tens of MHz. The operational amplifiers in FIG. 3 may be implemented using wide bandwidth model no. HA-5190 operational amplifiers manufactured by Harris, Inc.

Figure 3:
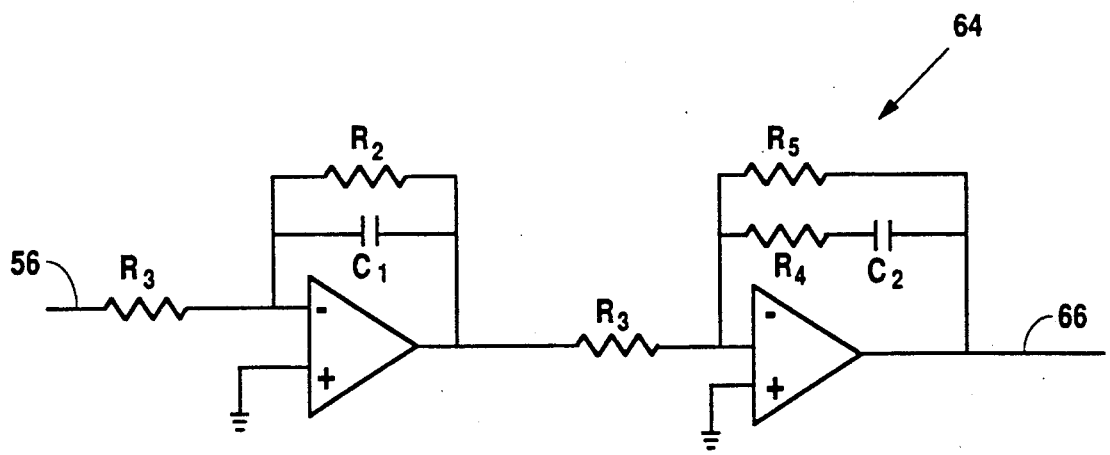
FIG. 3 is schematic circuit diagram of a closed loop filter placed within the feedback loop in accordance with the present invention.

OP amp configuration of filter 64 may take the form shown in FIG. 3, wherein $R_5$ is much greater than $R_4$ and $R_3$. Furthermore, resistor $R_3$ is greater than resistor $R_4$. Even further, resistor $R_2$ is much greater than resistor $R_1$. The specific values for the indicated components C1, C2, and R1-R5 can vary to allow to provide suitability for various applications. What is important, however, is that a filter design be realized which provides a transfer function H(f) which will be described below. FIG. 3 describes one of many different embodiments which can be utilized to provide the desired transfer function having electrical output signal 56 being amplified and filtered to produce a modified electrical output signal 66. Modified electrical output signal 66 is then used to electrically control the acousto optic phase modulator 54.

To further analyze the present system, the optical signals at the output of the first coupler 42, i.e., the sensor beam and reference beam 44 and 46, may be approximated as $$E_1 = \frac{E_o}{\sqrt{2}} e^{j[\phi(t) + W_1(t)]} \quad (1)$$

$$E_2 = -\frac{E_o}{\sqrt{2}} je^{j[\phi(t) + W_1(t)]} \quad (2)$$

where $E_o$ is the magnitude of the received optical field, $j = \sqrt{-1}$, and $$\phi(t) = \omega_{LO} t + \theta + \sum_{k=-\infty}^{\infty} \Delta\phi d_k P(t - kT_s) + \frac{n_s(t)}{E_o}.$$

In this latter equation, $\omega_{LO}$ is the remote optical source nominal frequency, $\Delta\phi$ is the change in phase angle, and $W_1(t)$ is a standard Wiener process with variance equal to the reciprocal of the transmitter optical source, or laser, coherence time, $\tau_c$, i.e., $$\sigma^2_{W_1} = \frac{1}{\tau_c},$$

$\theta$ is a uniformly distributed phase on $[-\pi, \pi]$, $d_k$ is a random binary symbols taking on $-1$ and $+1$ with equal probability, $T_s$ is the symbol interval, $P(t)$ is a unit amplitude NRZ pulse of duration $T_s$, $2\Delta\phi$ is the phase shift associated with a transition in $d_k$ from $-1$ to $1$, or vice versa, and $n_s(t)$ is the quadrature component of an additive white Gaussian noise (AWGN) corrupting the received signal.

As described herein, "Wiener process" is a standard Wiener process commonly known in the art. Pertinent portions of references which provide background information on the Wiener process is incorporated herein and described in Papoulis, A., *Probability, Random Variables, and Stochastic Processes* (McGraw-Hill, Second Ed., 1984), pp. 213-215; and Stark, H., et al., *Probability,* *Random Processes, and Estimation Theory for Engineers* (Prentice-Hall, First Ed., 1986), pp. 273-276.

Additive white gaussian noise (AWGN) accounts for the blackbody background radiation as well as thermal noise generated by optical repeaters/amplifiers. In practice, blackbody radiation is negligible at optical frequencies. However, optical input signal 32 is periodically amplified or processed by a chain of repeaters and amplifiers along the communication channel or path 28 prior to detection by receiver 30. This process inevitably adds thermal noise to the received input signal 32 as it is applied to receiver 30.

Equations 1 and 2 are reasonable approximations when $E_o \gg n_s(t)$. In the absence of modulation, the combination of the standard Wiener process $W_1(t)$ and random phase $\theta$ gives rise to a Lorentzian shaped laser spectrum. Assuming that $|\Delta\phi| < \pi/2$, which results in the presence of a pilot carrier in the received input signal 32. With some modification of the output of the modulation optics 52 (i.e., nonlinear processing of such signals), the recovered signal for $|\Delta\phi| = \pi/2$ may be post-processed for carrier synchronization.

The optical fields at the inputs of the second 3-dB coupler 48 may now be expressed as:

$$E_1' = \frac{\alpha E_o}{\sqrt{2}} e^{j[\phi(t-\Delta) + W_1(t-\Delta)]} \quad (3)$$

$$E_2' = -\frac{jE_o}{\sqrt{2}} e^{j[\phi(t) + W_1(t) + \hat{W}(t)]} \quad (4)$$

where $\hat{W}(t)$ is an estimate of $W_3(t)$ described below, represented by the feedback electrical voltage provided by filter 64 also described below, and $$\alpha^2 = 10 - \left(\frac{\epsilon \Delta L}{10 dB}\right)$$

($\epsilon$ signifies the fiber attenuation constant in dB/km and $\alpha^2$ is the power attenuation factor), $\alpha^2$ represents the attenuation due to propagation in the delay branch of the interferometer 36 (preferably a Mach-Zehnder interferometer) and $\Delta$ is the time delay associated with transmission over the fiber of length $\Delta L$, formed by loop 50, which is considered to be significantly larger than laser coherence length. This consequently results in the dependence of $W_1(t-\Delta)$ on $W_1(t)$. Thus, for all practical purposes, $W_1(t-\Delta)$ may be replaced by a Wiener process $W_2(t)$ independent of, but similar in characteristic to $W_1(t)$. Therefore, $$E_1' = \frac{\alpha E_o}{\sqrt{2}} e^{j[\phi(t-\Delta) + W_2(t)]} \quad (5)$$

Moreover, $\Delta L$ satisfies the quadrature condition, i.e., $$\frac{2\pi n}{\lambda} \Delta L = \frac{\pi}{2} + 2m\pi$$

with n, m, and $\lambda$ describing the refractive index of the fiber, an arbitrary integer, and the wavelength of the received input signal 32, respectively. Note that m may be selected such that $\Delta L$ is significantly greater than the remote optical source coherence length. The quadrature condition results in a $\pi/2$ phase shift in $E_1'$ with respect to $E_2'$, i.e., $$\phi(t-\Delta) = \omega_{LO}t + \theta + \sum_{k=-\infty}^{\infty} \Delta\phi d_k P(t - \Delta - kT_s) + \frac{n_s(t-\Delta)}{E_o} - \frac{\pi}{2} \quad (5a)$$

As a result of combining $E_1'$ and $E_2'$ and considering that photodetectors 58 found within photodetector 52 can be classified as low-pass envelope detectors, it can be shown that the voltage at the output of amplifier 60 may be expressed as:

$$V_{out}(t) = G_{amp}rR\alpha E_o^2 \sin\left[W_3(t) - \hat{W}(t) + d(t-\Delta) - d(t) + \frac{n_s(t-\Delta) - n_s(t)}{E_o}\right] + G_{amp}[n_{sh}^{(1)}(t) - n_{sh}^{(2)}(t) + n_{th}(t)] \quad (6)$$

Where $G_{amp}$ is the voltage gain of amplifier 60, r is the resistance of the photodetector load resistors 62, R is the responsivity of photodetectors 58 in amperes/watt (A/W), $W_3(t) = W_2(t) - W_1(t)$ and describes a standard Wiener process with a variance twice that of the variance of $$W_1(t), d(t) = \sum_{k=-\infty}^{\infty} \Delta\phi d_k P(t-kT_s), n_{sh}^{(1)}(t) \text{ and}$$

$$n_{sh}^{(2)}(t) \text{ are two}$$

independent shot noise processes generated by the first and second photodetectors 58, and $n_{th}(t)$ is the combined receiver 30 thermal noise at the output of amplifier 60 (including the contributions of the two resistors 62 as well as the amplifier 60). The shot noise processes may be combined into a single process $n_{sh}(t)$ defined by $n_{sh}(t) = n_{sh}^{(1)}(t) - n_{sh}^{(2)}(t)$. The total shot noise and thermal noise processes have two-sided power spectral densities (PSD) in (Volts)$^2$/Hz given by $$S_{nsh}(f) = 2\left(\frac{qRE_o^2\alpha r^2}{2}\right)$$

and $$S_{nth}(f) = K_B T^{\circ}(F_a - 1)r + 2\frac{K_B T^{\circ} r}{2},$$

respectively, (q, $K_B$, $F_a$ are the charge of an electron, the Boltzman constant, and the amplifier noise figure, respectively). Also, $T^{\circ} = 290$ Kelvin. The one-sided PSD of the Wiener process $W_3(t)$ may accurately be described as:

$$S_{w3}(f) = \frac{2\Delta\nu}{\pi f^2}[1-\cos(2\pi f\Delta)] + \frac{k_f}{f^3}; 0 < f < \infty \quad (7)$$

in (rad/s)$^2$/Hz. $\Delta\nu$ and $k_f$ describe remote laser source linewidth (FWHM), or the white frequency noise (WFN) portion of optical source 26 laser source, and the flicker noise (FN), respectively. In addition, f describes frequency in Hertz. A factor of $[1 - \cos(2\pi f\Delta)]$ is included in the above equation to account for the fact that $W_3(t)$ is the difference between two correlated Wiener processes.

To further analyze receiver network 30 as set forth herein, the observed voltage of electrical output signal 56 is examined below in some detail. The observed voltage $V_{out}(t)$ of electrical output signal 56 contains all the necessary components to be used for tracking the random phase interference $W_3(t)$. Under the assumption that the initial tracking has been achieved, i.e., when $W_3(t) \approx \hat{W}(t)$, and when $n_s(t)/E_o <\!< 1$ and $\Delta\phi < \pi/2$, the sinusoidal term of $V_{out}(t)$ of equation (6) can be linearized. Phase error directly impacts the decision making process and immediately follows the phase tracking subsystem, wherein phase error is defined as $W_e(t) \triangleq W_3(t) - \hat{W}(t)$.

Filtering of electrical output signal 56 through filter 64 results in $\hat{W}(t)$ which can be used in a controlled loop as depicted in FIG. 2. Consequently, an integro-differential equation describing the dynamics of this loop can be obtained, and is given below:

$$W_e(t) = W_3(t) - \quad (8)$$

$$KH(p)\left\{W_e(t) + (e^{-p\Delta}-1)\left[d(t)+\frac{n_s(t)}{E_o}\right] + \frac{G_{amp}}{K}n_e(t)\right\}$$

where p is a Heaviside operator, $K = G_{amp}rR\alpha E_o^2$, and $n_e(t) = n_{sh}^{(1)}(t) - n_{sh}^{(2)}(t) + n_{th}(t)$, which is modeled as an AWGN with two-sided PSD level $S_{ne}(f) = qRE_o^2\alpha r^2 + K_B T^{\circ}(F_a - 1)r + K_B T^{\circ} r$. This is possible since the shot noise and the thermal noise processes are all independent. Considering that $$H(p) = \frac{F(p)}{p},$$

one can solve for $W_e(t)$ can be computed, which is given by $$W_e(t) = [1 - H_L(p)]W_3(t) - \quad (9)$$

$$H_L(p)\left\{(e^{-p\Delta}-1)\left[d(t)+\frac{n_s(t)}{E_o}\right] + \frac{G_{amp}}{K}n_e(t)\right\}$$

where $H_L(p)$ is the closed-loop transfer function that is given by $$H_L(p) = \frac{KF(p)}{p + KF(p)} \quad (10)$$

Using (9) and with the aid of Fourier analysis, the variance of the phase error process can be computed as $$\sigma^2_{W_e} = \int_{-\infty}^{\infty} |1 - H_L(f)|^2 S_{W_e}(f)df + \quad (11)$$

$$4\int_{-\infty}^{\infty} |H_L(f)|^2 \sin^2(\pi f\Delta)S_d(f)df +$$

$$\frac{4}{E_o^2}\int_{-\infty}^{\infty} |H_L(f)|^2 \sin^2(\pi f\Delta)S_{ns}(f)df +$$

$$\frac{G^2_{amp}}{K^2}\int_{-\infty}^{\infty} |H_L(f)|^2 S_{ne}(f)df$$

where $S_{ns}(f) = K_B T_b$ is the two-sided PSD of the noise process $n_s(t)$ which is flat over the frequency range of interest. $T_b$ is the noise temperature generated by the optical amplification/regeneration process and the blackbody background radiation. $H_L(p)$. $H_L(f)$ is the transfer function represented in frequency domain of the corresponding Laplacian closed-loop transfer function $H_L(p)$. The second term in the above equation accounts for the contribution of the data-to-phaselock crosstalk, which proves to be rather significant.

At this point, it becomes necessary to define the one-sided loop bandwidth (or loop noise bandwidth) described in the following equation:

$$B_L \triangleq \int_0^\infty |H_L(f)|^2 df \qquad (12)$$

The relationship among some of the important systems parameters discussed above can be elaborated upon by realizing that the time delay $\Delta$ is considerably larger than the coherence time of the remote optical source, and for reasons that will become apparent, it may be necessary to assume that $$\Delta^{-1} << \Delta\nu << B_L$$

$$\Delta^{-1} << \Delta\nu << T_s^{-1} \qquad (13)$$

where it is assumed that the coherence time of the optical source input is inversely proportional to the source input linewidth, $\Delta\nu$. This also satisfies the general transmitter laser linewidth requirement for the homodyne system, i.e, $\Delta\nu T_s << 1$. The relationship between the PLL loop bandwidth, the optical source linewidth, and the symbol rate $T_s^{-1}$, will be discussed below.

Realizing the above, equation 11 can be evaluated for a second order loop, which proves to be the ideal loop for tracking the optical source phase instabilities described above (i.e., when the WFN and FN are present). For a second order loop (i.e., when $$F(f) = \frac{2\pi j f \tau_2 + 1}{2\pi j f \tau_1},$$

the closed loop transfer function may be expressed as $$H_L(f) = \frac{1 + j2\pi f(2\zeta/\omega_n)}{1 + j2\pi f(2\zeta/\omega_n) - (2\pi f/\omega_n)^2} \qquad (14)$$

where $\zeta$ and $\omega_n$ are the loop damping and natural frequency, respectively. It is known that $$B_L = \frac{\omega_n}{8\zeta}(1 + 4\zeta^2).$$

A critically damped loop, i.e., $$\zeta = \frac{1}{\sqrt{2}},$$

in the following relationship exists between the natural frequency of the loop and the loop bandwidth:

$$\omega_n = \frac{8B_L}{3\sqrt{2}}.$$

Consequently, the variance of the timing error may be computed and is given by $$\sigma^2_{\widetilde{\psi}_e} = \frac{7.4\Delta\nu}{\pi B_L} + \frac{8.71 k_f}{B_L^2} +$$

$$2\frac{G^2_{amp}}{K^2} B_L S_{ne}(0) + \left[\frac{4}{E_o^2} S_{ns}(0) + 4(\Delta\phi)^2 T_s\right]\Gamma \qquad (15)$$

$S_{ne}(0)$ and $S_{ns}(0)$ are the PSD's of the equivalent noise and the quadrature component of the received (optical amplifier/repeater) thermal noise at $f=0$, respectively, and $\Gamma$ is a unitless quantity given by:

$$\Gamma = B_L\left[1 - \frac{\sqrt{10}}{3}\exp\left(-\frac{4\Delta B_L}{3}\right)\sin\left(\frac{4\Delta B_L}{3} + \tan^{-1}(2) + \frac{\pi}{4}\right)\right]. \qquad (15a)$$

Considering that $\Delta B_L >> 1$, $\Gamma$ can be accurately approximated by $B_L$, i.e., $\Gamma \approx B_L$. Consequently, the variance of the phase error in terms of the unitless quantity $B_L T_s$ can be expressed as $$\sigma^2_{\widetilde{\psi}_e} = \frac{a_1}{(B_L T_s)} + \frac{a_2}{(B_L T_s)^2} + a_3(B_L T_s) \qquad (16)$$

where $a_1 = 7.4 (\Delta\nu T_s)/\pi$, $a_2 = 8.71(k_f T_s^2)$, and $$a_3 = 2\left(\frac{G_{amp}}{K}\right)^2 \left(\frac{S_{ne}(0)}{T_s}\right) + 2\left(\frac{2S_{ns}(0)}{E_o^2 T_s}\right) + 4[\Delta\phi]^2$$

are all unitless as well. The second term in $a_3$ is proportional to the inverse of the input signal-to-noise ratio of the input signal, $SNR_i$, given by $$SNR_i = \frac{E_o^2 T_2}{2 S_{ns}(0)}.$$

The influence of the input thermal noise, i.e., the blackbody background and optical amplifier/repeater noise, is therefore described in terms of the input signal-to-noise ratio.

The presence of the receiver thermal noise, which can no longer be ignored due to the absence of strong local oscillators (which were necessary in conventional receivers), sets this present invention apart from conventional design.

There exists an optimum noise-bandwidth-symbol-duration product, i.e., $B_{opt} T_s$, which minimizes the expression shown in equation (16). Such optimum product satisfies the following cubic function: $a_3(B_{opt} T_s)^3 - a_1(B_{opt} T_s) - 2a_2 = 0$, which can be solved numerically for known $a_1$, $a_2$, and $a_3$. Although the reduction in $B_L T_s$ directly decreases the third term in equation (16), a reduction in $B_L T_s$ directly increases the first two terms $$\left( \frac{a_1}{(B_L T_S)} \text{ and } \frac{a_2}{(B_L T_S)^2} \right).$$

Nevertheless, in the absence of the laser phase noise impairment, $B_L T_s$ should be kept to a minimum. However, when the impact of the transmitter laser phase noise is more pronounced than the noise processes, $B_L T_S$ can be increased to reduce the effects of the first two terms.

To gain further insight into the impact of various system parameters on performance, $\sigma_{we}^2$ is examined for various system parameters when optimum noise bandwidth is selected. This task is accomplished via numerical analysis shown hereinbelow. Before presenting such results, however, data recovery scheme of the present invention is described. A close examination of equation (6) shown above reveals that, when sin(.) term is linearized, the transmitted symbols can be recovered. However, the received symbols are corrupted by an equally powerful interference $d(t-\Delta)$. Note that $\Delta >> T_s$, and therefore the received signal $d(t-\Delta)$ represents symbols that are uncorrelated with $d(t)$. This problem is quite similar to the multipath interference generated by diffused paths in radio communication channels. This problem also arises in telephony world and is commonly referred to as the "echo" impairment. There are, however, a number of major differences between the problem at hand and the multipath and "echo" problems in RF and telephony channels. First, the desired and interfering signals operate at identical power levels. Second, $\Delta$, which is typically an unknown quantity in RF channels, is a known quantity here. Considering that error rates in optical communication systems are typically less than $10^{-9}$ and taking advantage of the assumption $10^{-9} << \Delta^{-1} T_s << 1$ or equivalently $\Delta << 10^9 T_s$ (i.e., with sufficiently high probability, the delay branch 68 of echo canceler circuit 70 contains no incorrect bits), the error propagation become a less serious matter.

Delay $\Delta$ branch 68 is related to $\Delta L$ of loop 50 via the following relationship:

$$\frac{2\pi n}{\lambda} \Delta L = \frac{\pi}{2} + 2m\pi = \omega_{LO}\Delta \quad (16)$$

where n, m, and $\nu$ describing the refractive index of the fiber, and arbitrary integer and the wavelength of the received input signal 32, respectively. This delay causes the presence of data as well its delayed version, delayed by $\Delta$ at the output of differential amplifier 60. The undesirable delayed signal, which appears as an "echo" should be subtracted by subtracting the recovered signal from an estimate of the delayed signal, thereby resulting in an echo cancellation. The recovered data $\hat{d}(t)$ at the output of circuit 72 is delayed by $\Delta$ to generate an estimate $\hat{d}(t-\Delta)$ for the signal $d(t-\Delta)$. Signals $\hat{d}(t)$ and $\hat{d}(t-\Delta)$ correspond to estimates of $d(t)$ and $d(t-\Delta)$, respectively. The signal at the input of device 72 is then a function of $d(t)$ only if $\hat{d}(t-\Delta) \approx d(t-\Delta)$. The "decision circuit" 72 is a pulse shaping circuit. A high speed/high sensitivity digital waveform regeneration module comprising a comparator, an edge-triggered D-flip-flop and an output driver may be used to realize circuit 72. For frequencies less than 2 GHz, Hewlett Packard, Inc. Model No. HDMP-2003 or Model No. HDMP-2004 may be utilized. For frequencies in excess of 2 GHz, MMIC GaAs technology may be used to realize a customized MMIC GaAs decision circuit. This device declares a "1" for inputs greater than the threshold and a "0" otherwise. Since delay circuit 68 is electrical, it may be realized using GaAs memory circuits. To determine the size of the memory in cancellation circuit 70, delay $\Delta$ is divided by the symbol duration $T_s$ and rounded to the closest integer. For instance, for a symbol duration of $10^{-9}$ s and delay of $10^{-4}$ s., one needs $10^{-4}/10^{-9} = 10^5$ bits memory to realize delay circuit 68. The memory circuit 68 must be a fast shift register, operating at the symbol rate $1/T_s$ of up to 2 GHz. Furthermore, the echo cancellation circuit 70, may be implemented on a single integrated chip such as a MMIC GaAs chip. Note that circuit 72 and delay branch 68 operate at several GHz range (RF range or microwave range) and that branch 68 and circuit 70 can be realized using GaAs devices. In fact, this arrangement can be highly desirable since it avoids the problems encountered in interfacing GaAs devices operating at microwave frequencies.

The performance in terms of bit error rate at the output of decision circuit 72, assuming all echo effects are entirely suppressed, can thereby be shown in the following formula:

$$P_e = Q\left( \sqrt{\frac{(\Delta\phi)^2 T_s^2}{2S_{n_e}(0)T_s/E_o^2 + (G_{amp}/K)^2 S_{n_e}(0)T_s + \sigma_{W_e}^2 T_s^2}} \right). \quad (17)$$

with $$Q(x) = \frac{1}{\sqrt{2\pi}} \int_x^\infty \exp\left(-\frac{y^2}{2}\right) dy.$$

Note that, in arriving at the above equation, the fact that the variance of the output of integrate-and-dump filter in decision circuit 72 when excited by a white Gaussian noise with two-sided PSD defined as $$\frac{N_0}{2} \text{ is } \frac{N_0 T_s}{2}$$

and that $n_s(t)$ and $n_s(t-\Delta)$ are uncorrelated random processes, have been exploited. Moreover, it is considered that $W_e(t)$, which has a correlation time proportional to the inverse of the OPLL loop bandwidth, is a slow varying process over $T_s$ (i.e., $B_L^{-1} >> T_s$, or $B_L T_s << 1$). This condition is satisfied for a reasonable set of system parameters. Realizing that bit error rate in the order of $10^{-9}$ is desired, the above equation may be upper bounded by $(Q(x) \approx 0.5 \exp(-x^2/2); x >> 1)$ $$P_e = \frac{1}{2} \exp\left[ - \frac{(\Delta\phi)^2/2}{\frac{1}{SNR_i} + (G_{amp}/K)^2 S_{nth}(0)/T_s + \frac{q}{R\alpha E_o^2 T_s} + \sigma_{W_e}^2} \right]. \quad (18)$$

For a homodyne system with OPLL subsystem, on the other hand, $$P_e = \frac{1}{2} \exp\left[ - \frac{(\Delta\phi)^2/2}{\frac{1}{2SNR_i} + \frac{q}{4(RE_o^2 T_s)} + \sigma_{W_e}^{2\prime}} \right],$$

where $\sigma_{W_e}^{2\prime}$ is the phase error variance when $n_{th}(t) \approx 0$, and is given by equation (16) with $a_3$ replaced by $$a_3' = \frac{q}{2R(\alpha E_o^2)T_s} + \frac{1}{SNR_i} + 2(\Delta\phi)^2.$$

Note that, for the homodyne system, a 3 dB improvement in the input SNR is resulted since $n_s(t-\Delta)$ is no longer present in equation (6).

For a negligible receiver thermal noise and when $\sigma_{W_e}^2 \ll 1$, the performance of the present system is within 3 dB of its homodyne counterpart for a background noise limited operation. Under quantum limit, however, the homodyne receiver is 6 dB more efficient than the present system. Due to optical amplification prior to detection, background noise is typically the dominant noise factor in such receivers, and power penalty in the range of 3 to 6 dB is a more realistic measure of performance.

As shown and fully described hereinabove, a method and apparatus are described for interferometric, self-homodyne optical detection of phase modulated optical signals. For a reasonable set of system parameters, acceptable performance in terms of bit error rate as defined in equation (17) and equation (18) may be expected. The performance was measured as a function of the optical source linewidth-symbol duration product in the range of $0.2 \times 10^{-5} \le \Delta\nu T_s \le 0.2 \times 10^{-4}$. Due to the absence of a local oscillator, the present invention is dominated by the background radiation, receiver thermal noise, and the nonzero optical source linewidth. Background noise in the receiver 30 is considered to be the sum of blackbody radiation, commonly present in optical and RF channels, and noise due to optical amplification/regeneration process. The former is considered significantly smaller than the latter at optical frequencies. For the input power and $SNR_i$ in excess of 0.1 mw and 30 dB, respectively, performance is mainly dominated by the linewidth of optical source 26. For a background noise limited operation the invention achieves a performance within 3 dB of its homodyne counterpart, whereas a 6 dB power penalty is incurred for quantumlimited operation. Thus, the output from echo cancellation circuit 70 is a signal proportional to the transmitted data bits present in the optical carrier signal 32, but without having to pay the penalty of requiring a local oscillator or laser.

Further modifications and alternative embodiments of the apparatus of this invention will be apparent to those skilled in the art in view of the description. Accordingly, the description is to be construed as illustrative only and is for the purpose of teaching those skilled in the art the manner in carrying out the invention. It is to be understood that the forms of the invention herein shown and described are to be taken as the presently preferred embodiments. Various changes can be made to the network or components found within the network circuit and/or arrangement of those components. Certain features of the invention may be utilized independently of the use of the those features, all as would be apparent to one skilled in the art after having a benefit of the description of the invention. As can be appreciated from the above discussion, the apparatus and analysis described hereinabove present a marked practical advance over conventional optical receivers which require local oscillation and the inherent disadvantages associated therewith.

What is claimed is:

1. A self-homodyne optical receiver comprising:
   a delay channel and a reference channel optically coupled to the delay channel, wherein said delay channel is capable of receiving a phase-modulated optical input signal;
   a phase delaying loop optically coupled to said delay channel for producing a phase delayed optical signal in quadrature phase with the input signal;
   an optical-to-electrical photodetector coupled to the delay channel;
   a differential amplifier coupled to an output of the photodetector; and
   a phase modulator optically coupled to the reference channel and indirectly controlled by an electrical output signal from the differential amplifier.

2. The self-homodyne optical receiver as recited in claim 1, wherein said reference channel is optically coupled to said delay channel at two locations along said delay channel with said phase modulator optically coupled to the reference channel between said two locations.

3. The self-homodyne optical receiver as recited in claim 1, further comprising a second optical-to-electrical photodetector coupled to the reference channel.

4. The self-homodyne optical receiver as recited in claim 1, wherein said photodetector includes at least one photodiode coupled to the delay channel.

5. An interferometric, self-homodyne optical receiver comprising:
   an interferometer including a delay channel and a reference channel optically coupled to the delay channel, wherein said delay channel is capable of receiving a phase modulated optical input signal;
   an electrically controllable phase modulator optically coupled to said reference channel for phase adjusting said phase modulated optical signal;
   a phase delaying loop optically coupled to said delay channel for producing a phase delayed optical signal in quadrature phase with said input signal;
   at least one photodiode coupled to receive said phase adjusted optical input signal optically combined with said phase delayed optical signal;
   a differential amplifier electrically coupled to an output of said photodiode for producing an electrical output signal which changes corresponding to changes in the phase difference between the phase of the phase adjusted signal and the phase delayed optical signal; and said electrical output signal coupled to said phase modulator for passively controlling the phase of the phase modulated optical input signal in response to changes in the electrical output signal.

6. The interferometric, self-homodyne optical receiver as recited in claim 5, wherein said interferometer comprises a pair of evanescent couplers for optically coupling the delay channel and the reference channel at two locations separated at a controllable distance.

7. The interferometric, self-homodyne optical receiver as recited in claim 6, wherein said evanescent couplers comprise single mode 3 dB couplers.

8. The interferometric, self-homodyne optical receiver as recited in claim 5, wherein said differential amplifier compares changes in electrical signals corresponding to changes in the phase of the phase modulated optical input signal combined with the phase delayed optical input signal.

9. An optical transmission system, comprising:
   an optical source for generating a phase modulated optical input signal;
   a self-homodyne optical receiver comprising:
     a delay channel coupled to a first end of the delay channel to receive the optical input signal;
     a reference channel coupled to the delay channel to receive the optical input signal therein;
     a phase delay loop coupled to the delay channel to form a phase delayed optical signal within the delay channel wherein said phase delayed signal is in quadrature phase with said input signal;
     a phase modulator optically coupled to the reference channel to phase adjust said input signal within the reference channel;
     a photodetector coupled to a second end of the delay channel opposite the first end to convert the phase delayed signal combined with the phase adjusted optical input signal therein to a corresponding electrical signal;
     a differential amplifier coupled to receive the electrical signal; and
     a feedback electrical signal sent from the amplifier to the phase modulator for passively tracking the phase of the optical input signal in proportion to a phase difference output from the differential amplifier.

10. The transmission system as recited in claim 9, wherein said optical source includes a remote laser.

11. The transmission system as recited in claim 9, further comprising an optical path coupled between the optical source and the receiver.

12. The transmission system as recited in claim 9, wherein said photodetector includes at least one photodiode coupled to the second end of the delay channel.

13. A method for detecting phase modulated optical signals and recovering data modulated about said signal, comprising:
    receiving a phase modulated optical input signal into a delay channel;
    coupling the input signal into a reference channel;
    phase delaying the input signal within the delay channel so that said phase delayed input signal is in quadrature phase with said input signal;
    phase adjusting the input signal within the reference channel to produce a phase adjusted input signal;
    producing an electrical output signal proportional to the phase difference between the phase delayed input signal and the phase adjusted input signal, wherein said electrical output signal has a delay component; and
    detecting the input signal within said delay channel in accordance with changes in the electrical output signal.

14. The method as recited in claim 13, wherein said phase modulating comprises passive phase modulating the input signal within said reference channel with respect to said input signal.

15. The method as recited in claim 14, wherein said passive phase modulating comprises phase adjusting the input signal absent a local oscillator.

16. The method as recited in claim 13, wherein said phase delaying comprises providing a delaying loop within the delay channel.

17. The self-homodyne optical receiver as recited in claim 1, wherein said electrical output signal has a delay component.

18. The self-homodyne optical receiver as recited in claim 17, further comprising an echo canceller coupled to said differential amplifier for removing said delay component from said electrical output signal.

19. The optical transmission system of claim 9, wherein said feedback electrical signal has a delay component.

20. The optical transmission system of claim 19, further comprising an echo canceller coupled to said differential amplifier for removing said delay component from said electrical output signal.

21. The method as recited in claim 16, said detecting step further comprising cancelling the delay component from said electrical output signal.

22. A method of detecting information from a phase-modulated optical signal, comprising:
    receiving a phase-modulated optical input signal into a delay channel having a delay loop;
    coupling the input signal into a reference channel;
    phase delaying the input signal within the delay channel so that said phase delayed input signal is in quadrature phase with said input signal;
    phase adjusting the input signal within the reference channel to produce a phase adjusted input signal;
    comparing the phase delayed input signal with the phase adjusted input signal;
    producing an electrical error signal proportional to the phase difference between the phase delayed input signal and the phase adjusted input signal, wherein said electrical output signal has a delay component;
    cancelling said delay component from said electrical error signal; and
    detecting the modulation term of the phase-modulated input optical signal from said electrical error signal.

23. Apparatus for detecting information from a phase-modulated optical input signal, comprising:
    an interferometer including a delay channel and a reference channel optically coupled to the delay channel, wherein said delay channel is capable of receiving a phase modulated optical input signal;
    an electrically controllable phase modulator optically coupled to said reference channel for phase adjusting said phase modulated optical signal;
    a phase delaying loop optically coupled to said delay channel for producing a phase delayed optical signal in quadrature phase with said input signal;
    at least one evanescent coupler for optically coupling the delay channel to the reference channel;

a photodiode coupled to the delay channel to receive said phase adjusted optical input signal optically combined with said phase delayed optical signal;

a photodiode coupled to the reference channel to receive said phase adjusted optical input signal optically combined with said phase delayed optical signal;

a differential amplifier electrically coupled to an output of each of said photodiodes for producing an electrical error signal which changes corresponding to changes in the phase difference between the phase of the phase adjusted signal and the phase delayed optical signal, wherein said error signal carries the modulation information of the optical input signal and also contains a delay component;

said electrical error signal coupled to said phase modulator for passively controlling the phase of the phase modulated optical input signal in response to changes in the electrical error signal; and means for cancelling the delay component of said electrical error signal.

* * * * *

UNITED STATES PATENT AND TRADEMARK OFFICE
CERTIFICATE OF CORRECTION

PATENT NO. : 5,319,438  
DATED : June 7, 1994  
INVENTOR(S) : Kamran Kiasaleh

Page 1 of 2

It is certified that error appears in the above-indentified patent and that said Letters Patent is hereby corrected as shown below:

In column 5, line 57, delete "50".

In column 8, line 40, delete " $\alpha^2 = 10 - (\frac{\epsilon \Delta L}{10 db})$ " and insert -- $\alpha^2 = 10^{-(\frac{\epsilon \Delta L}{10 db})}$ -- therefor.

In column 11, line 1, delete "$S_{ns}(f)$" and insert -- $S_{n_s}(f)$ -- therefor.

In column 12, line 16, delete "$S_{ne}(\emptyset)$" and insert -- $S_{n_e}(0)$ -- therefor.

In column 12, line 16, delete "$S_{ns}(\emptyset)$" and insert -- $S_{n_s}(0)$ -- therefor.

In column 13, line 54, delete "$\nu$" and insert --$\lambda$- therefor.

In column 15, line 14, delete " $\sigma W_e 2'$ " and insert -- $\sigma^2_{W_e'}$ -- therefor.

UNITED STATES PATENT AND TRADEMARK OFFICE
CERTIFICATE OF CORRECTION

PATENT NO. : 5,319,438

DATED : June 7, 1994

INVENTOR(S) : Kamran Kiasaleh

It is certified that error appears in the above-indentified patent and that said Letters Patent is hereby corrected as shown below:

In column 15, line 24, delete " $\sigma W_e^2$ " and insert -- $\sigma_{W_e}^2$ -- therefor.

Signed and Sealed this

Sixth Day of September, 1994

Attest:

BRUCE LEHMAN

Attesting Officer     Commissioner of Patents and Trademarks